(12) United States Patent
Pankey et al.

(10) Patent No.: US 11,321,911 B2
(45) Date of Patent: May 3, 2022

(54) METHOD FOR REPRESENTING THE SURROUNDINGS OF A VEHICLE

(71) Applicant: Robert Bosch GmbH, Stuttgart (DE)

(72) Inventors: Cain Pankey, Gueglingen (DE); Jose Domingo Esparza Garcia, Stuttgart (DE); Raphael Cano, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 16/650,146

(22) PCT Filed: Sep. 3, 2018

(86) PCT No.: PCT/EP2018/073611
§ 371 (c)(1),
(2) Date: Mar. 24, 2020

(87) PCT Pub. No.: WO2019/072455
PCT Pub. Date: Apr. 18, 2019

(65) Prior Publication Data
US 2020/0226817 A1    Jul. 16, 2020

(30) Foreign Application Priority Data
Oct. 11, 2017   (DE) .......................... 102017218074.9

(51) Int. Cl.
*G06T 15/20*        (2011.01)
*B60R 1/00*         (2022.01)
(Continued)

(52) U.S. Cl.
CPC ................ *G06T 15/20* (2013.01); *B60R 1/00* (2013.01); *G06T 3/40* (2013.01); *G06V 20/58* (2022.01);
(Continued)

(58) Field of Classification Search
CPC .. G06T 15/20; G06T 3/40; B60R 1/00; B60R 2300/20; B60R 2300/30; B60R 2300/8093; G06K 9/00805; G08G 1/16
See application file for complete search history.

(56) References Cited

U.S. PATENT DOCUMENTS

| | | | | |
|---|---|---|---|---|
| 2008/0174452 A1* | 7/2008 | Yamamoto | ......... | B62D 15/0275 340/932.2 |
| 2013/0120578 A1* | 5/2013 | Iga | ..................... | B62D 15/0295 348/148 |
| 2013/0169792 A1* | 7/2013 | Mathes | ................ | B62D 15/027 348/119 |
| 2013/0242101 A1* | 9/2013 | Schneider | .......... | G06K 9/00805 348/148 |

(Continued)

FOREIGN PATENT DOCUMENTS

| | | |
|---|---|---|
| CN | 1607452 A | 4/2005 |
| CN | 102740056 A | 10/2012 |

(Continued)

OTHER PUBLICATIONS

International Search Report for PCT/EP2018/073611, dated Dec. 12, 2018.

*Primary Examiner* — Terrell M Robinson
(74) *Attorney, Agent, or Firm* — Norton Rose Fulbright US LLP; Gerard Messina (57) ABSTRACT

A method for representing the surroundings of a vehicle. The method includes: detecting the surroundings of the vehicle and ascertaining obstacles in the surroundings with the aid of surroundings sensors of the vehicle; displaying a first depiction encompassing a representation of the surroundings including the obstacles and a representation of the vehicle on a display device; establishing an approach by the vehicle to an ascertained obstacle due to the fact that a predefined distance to the obstacle has been undershot; and displaying a second depiction including a detail, enlarged in comparison to the first depiction, of the representation of the surroundings including the obstacles and the representation of the vehicle on the display device, the detail representing (Continued)

the area of the surroundings and of the vehicle at which the approach by the vehicle to the obstacle was established.

10 Claims, 5 Drawing Sheets

(51) Int. Cl.
    *G06T 3/40*         (2006.01)
    *G08G 1/16*         (2006.01)
    *G06V 20/58*       (2022.01)

(52) U.S. Cl.
    CPC ............ *G08G 1/16* (2013.01); *B60R 2300/20* (2013.01); *B60R 2300/30* (2013.01); *B60R 2300/8093* (2013.01)

(56) References Cited

U.S. PATENT DOCUMENTS

2015/0258991 A1*   9/2015  Fletcher ................ B60Q 9/008
                                                                             340/435

FOREIGN PATENT DOCUMENTS

| CN | 104204847 A | 12/2014 | |
|----|---|---|---|
| CN | 106556840 A | 4/2017 | |
| DE | 102008046214 A1 * | 4/2009 | ............... B60R 1/00 |
| DE | 102008046214 A1 | 4/2009 | |
| DE | 102011082475 A1 * | 3/2013 | ........... B62D 15/028 |
| DE | 102011082475 A1 | 3/2013 | |
| EP | 1179958 A1 | 2/2002 | |
| EP | 2555519 A1 | 2/2013 | |
| JP | 2011025874 A | 2/2011 | |

\* cited by examiner

METHOD FOR REPRESENTING THE SURROUNDINGS OF A VEHICLE

FIELD

The present invention relates to a method for representing the surroundings of a vehicle, in particular for displaying obstacles in the surroundings of the vehicle. Moreover, the present invention relates to a computer program product for carrying out such a method. Finally, the present invention relates to a control unit for a vehicle, which is designed for carrying out such a method, in particular for running a computer program product.

BACKGROUND INFORMATION

Conventional systems may display to the driver a graphic representation of the surroundings of his/her vehicle. Such systems are also referred to as surround view systems (SVS). In such surround view systems, in particular, a combination of a plurality of different sensor signals takes place, which are all displayed to the driver, so that a maximum amount of information may be provided to the driver. These pieces of information are ascertained, for example, from signals of video sensors, radar sensors, LIDAR sensors, ultrasonic sensors, or similar surroundings sensors. The pieces of information may also be combined with data that has already been stored, in particular, data existing in a cloud. In the end, a surround view system shows a wide variety of pieces of information. In the process, there is a risk, due to the large amount of pieces of information, that the driver of a vehicle encompassing a surround view system will not recognize hazards in a timely manner, such as the approach by the vehicle to an obstacle.

SUMMARY

An example method according to the present invention may permit a rapid and reliable detection of hazardous situations due to the vehicle approaching an obstacle. This is achieved due to the fact that, in addition to a first display, which provides the driver with an overview of the surroundings, a second depiction is displayed, which alerts the driver specifically to the risk of the approaching obstacle.

The example method according to the present invention for representing the surroundings of a vehicle includes the following steps, which are carried out, in particular, in the order presented in the following:

Initially, a detection of the surroundings of the vehicle as well as an ascertainment of obstacles in the surroundings of the vehicle take place with the aid of surroundings sensors of the vehicle. Surroundings sensors are, in particular, optical or acoustic sensors, in order to detect obstacles in the surroundings of the vehicle. These may be, in particular, camera systems, ultrasonic systems, and/or radar systems, as well as similar systems. It is particularly advantageous when the detection of the surroundings takes place with the aid of at least one camera, in order to be able to display graphic representations of the surroundings to a driver of the vehicle. Due to the implementation of the step of detecting, it is therefore known, on the one hand, in which surroundings the vehicle is located; on the other hand, obstacles in the surroundings of the vehicle are ascertained. Thereafter, a step of displaying a first depiction takes place. The first depiction encompasses a representation of the surroundings including the obstacles and a representation of the vehicle on a display device. The representation of the vehicle is, in particular, an animation of the host vehicle, which is superimposed with the representation of the surroundings and the obstacles. The representation of the surroundings and of the obstacles is, particularly advantageously, a graphic representation, which is generated from the data gathered in the above-described step of detecting and ascertaining. The display device is, in particular, an interface to the driver of the vehicle. The display device is, advantageously, a display device or a monitor and is mounted, for example, in an interior of the vehicle, such as in the center console of the vehicle. Moreover, an establishment of an approach by the vehicle to an ascertained obstacle takes place due to the fact that a predefined distance to the obstacle has been undershot. It is therefore established that a distance between the vehicle and the obstacle is decreasing and the vehicle is already located close to the obstacle. As a result, there is a risk, in principle, of the vehicle colliding with the obstacle. This may also be the case, in particular, at blind points, such as on lateral fenders of the vehicle. Such approaches to obstacles are to be reliably and unambiguously represented to the driver. Therefore, a step of displaying a second depiction takes place, including a detail, enlarged in comparison to the first depiction, of the representation of the surroundings including the obstacles. The second depiction also encompasses a representation of the vehicle. The representation of the vehicle is, in particular, the same as in the first depiction. If the second depiction is to be represented from a different perspective as in the first depiction, the representation of the vehicle is advantageously adapted in an appropriate way. The displaying of the second depiction also takes place on a display device, on which the first depiction was also already displayed. The detail from the representation of the surroundings including the obstacles, which is displayed in the second depiction, corresponds, in particular, to the area of the surroundings and of the vehicle at which the approach by the vehicle to the obstacle was established. Thus, an emphasis of the point, at which the vehicle approaches an obstacle takes place. The attention of the driver of the vehicle is therefore directed to the aforementioned approach, so that the driver may take appropriate measures in order to avoid a collision between the vehicle and the obstacle. A wide variety of information is therefore represented on the display device, particularly relevant pieces of information being explicitly emphasized with the aid of the above-described method. Therefore, there is no risk that the piece of information that the vehicle is approaching another obstacle becomes obscured, due to the large amount of represented information, and the driver does not notice the aforementioned piece of information. As a result, safety is enhanced during the operation of the vehicle, since the risk of damage by obstacles in the surroundings of the vehicle as well as of the host vehicle itself is reduced.

Preferred refinements of the present invention are described herein.

Advantageously, the first depiction and the second depiction show images from different virtual perspectives of a three-dimensional model of the surroundings. The three-dimensional model of the surroundings was preferably generated on the basis of the detected surroundings and the ascertained obstacles. The detection of the surroundings and the ascertainment of obstacles were described above. Due to the different virtual perspectives, therefore, a focus of the driver may be immediately directed to the area at which the vehicle is approaching an obstacle. It is therefore ensured that the driver unambiguously recognizes that the vehicle is approaching an obstacle.

Particularly advantageously, the second depiction is generated by changing the virtual perspective and/or changing a zoom of the first depiction. This is achieved, particularly advantageously, with the aid of virtual camera panning, in that the driver of the vehicle is shown an animation, on the display device, which corresponds to the change of perspective. The image represented on the display device is therefore modified in such a way that the driver gets the impression that the perspective migrates to the hazard spot, i.e., the perspective migrates to the spot of the vehicle at which the obstacle approaches the vehicle. The attention of the driver is therefore immediately directed to the aforementioned hazard spot. This is assisted, in particular, by way of the fact that the second depiction arises directly from the first depiction.

In one alternative embodiment of the present invention, it is provided that the first depiction represents an image from a virtual perspective of a three-dimensional model of the surroundings, while the second depiction schematically represents a distance between vehicles and an obstacle, which the vehicle is approaching. The second depiction advantageously includes no textures. Therefore, the image of the first depiction is designed to be highly detailed, since, in particular, textures are utilized for visualizing the representation of the surroundings. A merely schematic approach is utilized for the second depiction, however. This may take place, in particular, due to the fact that a maximum detection range of the surroundings sensors is schematically displayed around a representation of the vehicle, the area in which the surroundings sensors have detected obstacles being appropriately characterized. Alternatively, the detected outer edges of the obstacles may also be represented by appropriate lines, in order to implement the second display. In this way, the distance to the obstacle is immediately made clear to the driver of the vehicle, so that the driver may initiate appropriate driving maneuvers in order to avoid a collision between the vehicle and the obstacle.

In one further alternative, the first depiction and the second depiction are separate depictions. This has the advantage that the first depiction remains unchanged, while the second depiction takes place merely in order to emphasize aforementioned approaches of the vehicle to an obstacle. Due to the separate representation, it is also made possible, in particular, to appropriately visualize multiple spots at which the vehicle approaches an obstacle. This is advantageous, in particular, during parking processes, when the vehicle approaches at a plurality of areas the proximity of obstacles, i.e., other parking vehicles and/or boundary walls.

The second depiction is advantageously represented on the display device in such a way that it is superimposed on at least a subarea of the first depiction. Therefore, the driver of the vehicle has the impression that a notification is being transmitted to him via the display device. This notification takes place in a separate window, which is superimposed upon the original display, i.e., the first depiction. Therefore, the driver is given the impression that the second depiction has a higher priority than the first depiction. The driver may immediately and unambiguously recognize that the vehicle is approaching an obstacle.

In another alternative, the display of the first depiction and of the second depiction takes place next to one another on the display device. For this purpose, in particular, the first depiction is scaled, in order to create space on the display device for the second depiction. If the first depiction is not represented on the display device in such a way that it occupies the entire display device, then such a scaling is also unnecessary. With the aid of this alternative, no superimpositions are present. Therefore, no information gets lost due to the display of the second depiction, which would occur in the case of a superimposition of the second depiction. Moreover, the driver of the vehicle may see the first depiction in its entirety, which was also the case before the display of the second depiction.

In the first depiction and/or in the second depiction, the representations of obstacles being approached by the vehicle are advantageously emphasized. This may be the case, in particular, in such a way that the aforementioned obstacles are provided with a frame in the representation, the frame advantageously being designed to be flashing. A signal color may also be superimposed onto the obstacles in the representation, the aforementioned signal color also being designed to be flashing. Other measures are also possible. In this way, the driver is explicitly shown where a collision between the vehicle and an obstacle could take place. The driver is therefore explicitly given the opportunity, due to the early detection of a possible collision, of initiating appropriate driving maneuvers in order to avoid the aforementioned collision.

The present invention also relates to a computer program product. The computer program product encompasses instructions, which, when run on an evaluation unit, prompt the evaluation unit to carry out the steps of the above-described example method. An evaluation unit may be, in particular, a control unit of a vehicle. The aforementioned control unit merely needs to be connected to surroundings sensors and a display device for this purpose.

Finally, the present invention relates to a control unit for a vehicle. The control unit encompasses at least one interface for the connection of surroundings sensors. In addition, a display device may be connected to the interface. Therefore, the control unit is capable, in particular, of actuating the surroundings sensors in order to detect the surroundings of the vehicle and in order to ascertain obstacles in the surroundings of the vehicle. The control unit is therefore advantageously configured for running a computer program product of the type described above, or for carrying out a method as described above. The control unit may therefore provide a driver of the vehicle with assistance during the navigation of the vehicle through surroundings including obstacles, in order to thus avoid a risk of collisions between the vehicle and the obstacles.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
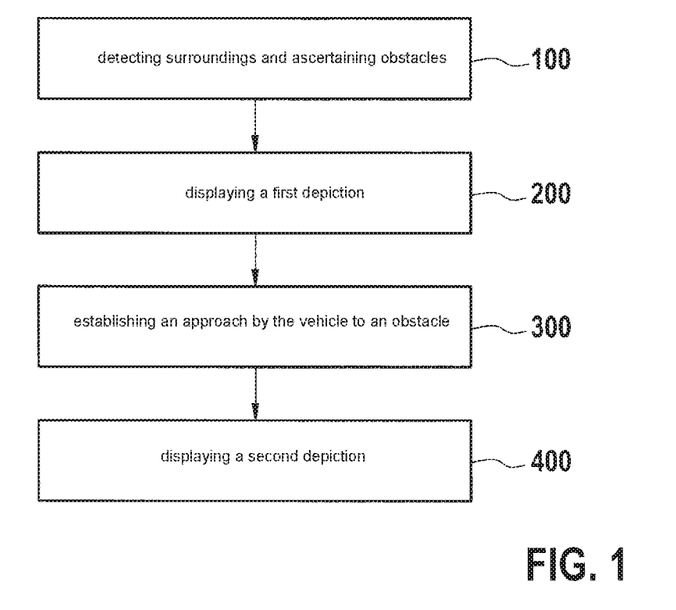
FIG. 1 is a schematic view of a flow chart of a method according to one exemplary embodiment of the present invention.

FIG. 1 schematically shows a flow chart of a method according to one exemplary embodiment of the present invention. The flow chart includes the steps of detecting the surroundings and ascertaining obstacles 100, of displaying a first depiction 200, of establishing an approach by the vehicle to an obstacle 300, and of displaying a second depiction 400. These steps are explained in the following, reference being made to vehicle 1, shown in FIG. 2, encompassing a control unit 11. Control unit 11 is utilized for carrying out the method shown in FIG. 1, control unit 11 being connected to a display device 10. Therefore, control unit 11 may prompt display device 10 to display depictions. In addition, control unit 11 is connected to surroundings sensors 8, 9, surroundings sensors 8, 9 encompassing ultrasonic sensors 8 and a camera system 9. With the aid of camera system 9, in particular, a three-dimensional detection of the surroundings of vehicle 1 is made possible. With the aid of ultrasonic sensors 8, in particular, short to mid-range distances may be highly precisely detected.

Figure 2:
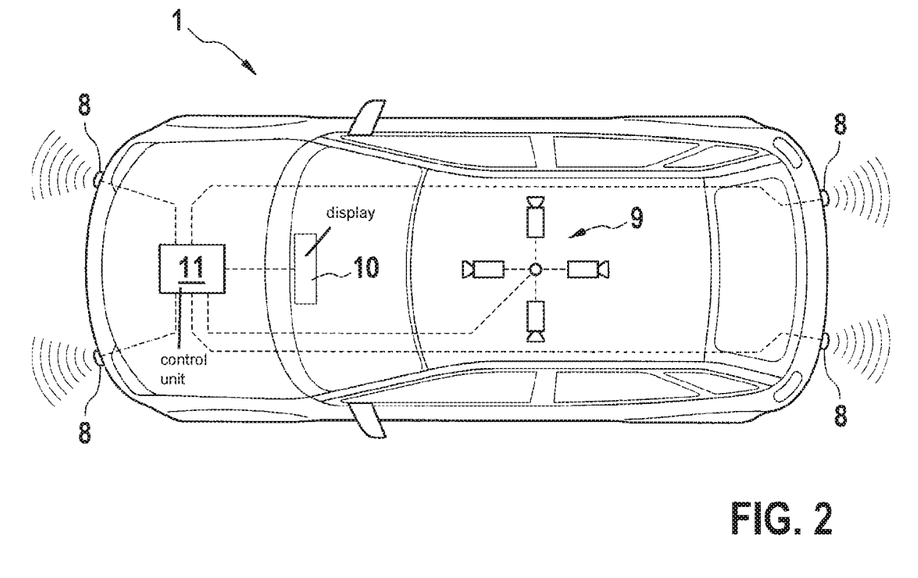
FIG. 2 is a schematic view of a vehicle encompassing a control unit according to one exemplary embodiment of the present invention.

In order to implement the method according to the exemplary embodiment, initially a detection 100 of the surroundings of vehicle 1 takes place, together with an ascertainment of obstacles in the surroundings of the vehicle. This takes place with the aid of surroundings sensors 8, 9, so that, in particular, a graphic representation, i.e., a representation including textures, of the surroundings of vehicle 1 is present. This means, a highly accurate image of the surroundings may be displayed to a user, in particular, a driver of the vehicle.

Figure 3:
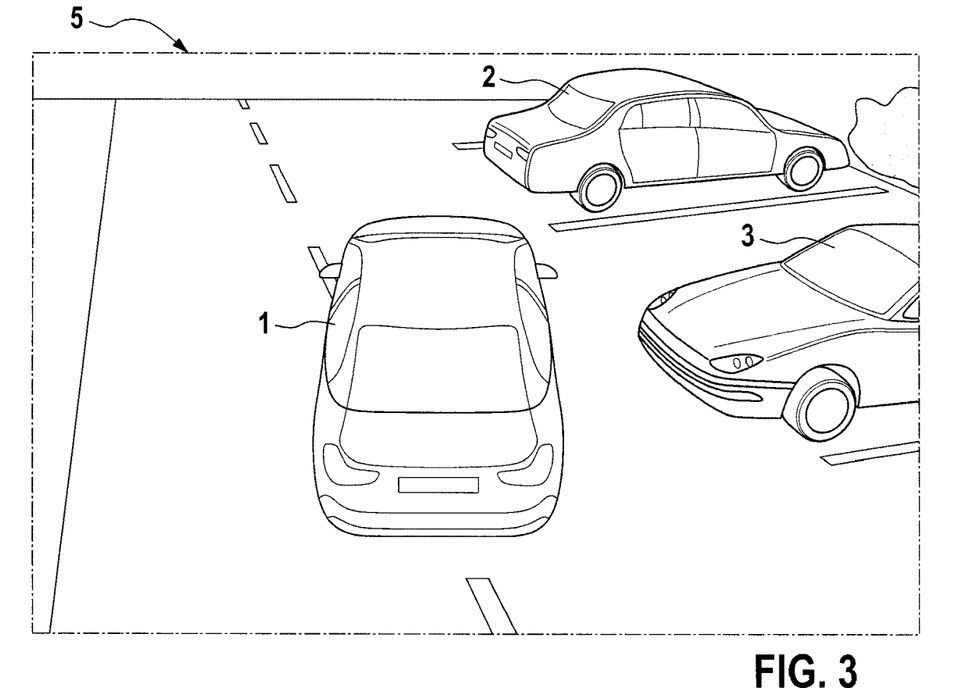
FIG. 3 is a first schematic representation of a first depiction during the implementation of the method according to one exemplary embodiment of the present invention.
Figure 4:
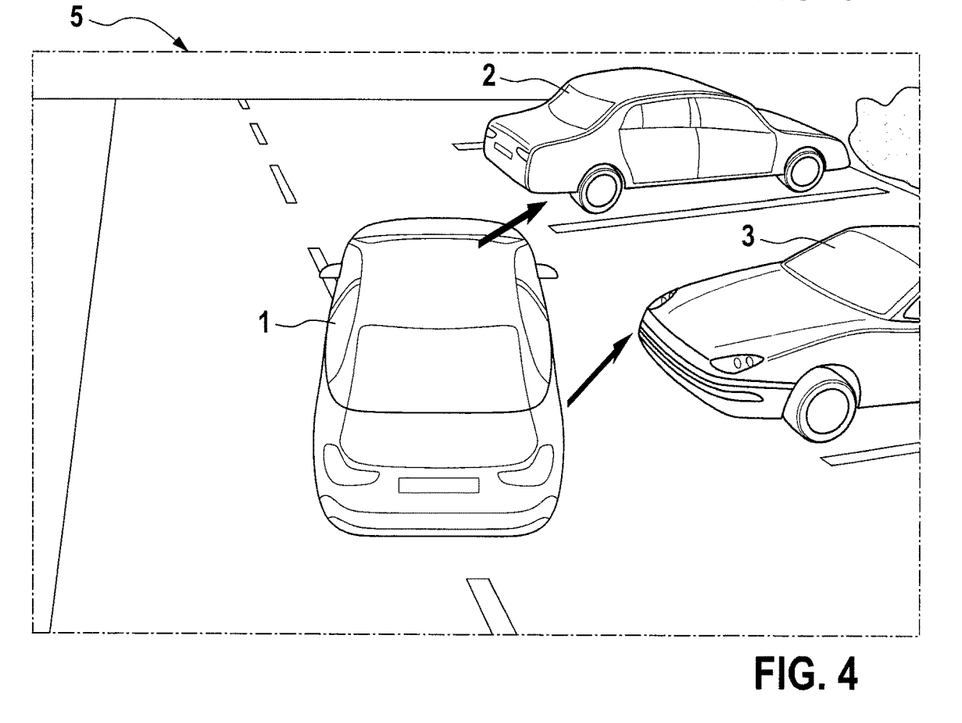
FIG. 4 is a second schematic representation of the first depiction during the implementation of the method according to one exemplary embodiment of the present invention.

Thereafter, a display 200 of a first depiction 5 takes place, an exemplary first depiction 5 being shown in FIG. 3 and in FIG. 4. Due to camera system 9, it is made possible to generate a three-dimensional model of the surroundings, the distance information of ultrasonic sensors 8 being additionally utilized. This means, the textures captured by camera system 9 may be processed, with reference to the distance information, in order to form a three-dimensional model, obstacles being displayed to the driver of vehicle 1, in that the driver gazes, from a virtual perspective, at the three-dimensional model encompassing a virtual depiction of vehicle 1 and of the surroundings.

A parking situation is shown, by way of example, in FIGS. 3 and 4. The driver of vehicle 1 would like to park in a parking space. The parking space is delimited by a first obstacle 2 and a second obstacle 3, first obstacle 2 and second obstacle 3 being adjacently parked vehicles. In the first depiction, the driver notices these vehicles and, therefore, may avoid first obstacle 2 and second obstacle 3. Potential hazard spots are present, however, as indicated in FIG. 4. These hazard spots are, in particular, outer corners of first obstacle 2 and of second obstacle 3. These outer corners will approach lateral shoulders of vehicle 1 as the parking process continues, so that there is a risk of a collision between vehicle 1 and first obstacle 2 and second obstacle 3.

Therefore, the step of establishing 300 the approach by vehicle 1 to one of ascertained obstacles 2, 3 in the surroundings takes place due to the fact that a predefined distance to obstacle 2, 3 has been undershot. This may be detected, in particular, with the aid of ultrasonic sensors 8, since a distance between vehicle 1 and obstacles 2, 3 decreases. As soon as such an approach by vehicle 1 has been detected and the distance to obstacle 2, 3 falls below the predefined distance, a potential collision is to be assumed, which is why the aforementioned step of displaying 400 takes place in a second depiction 6, 7.

Due to displaying 400 of second depiction 6, 7, the driver is explicitly warned about a risk of the collision between the vehicle and obstacles 2, 3. In the process, displaying 400 of second depiction 6, 7 may take place in different ways.

Figure 5:
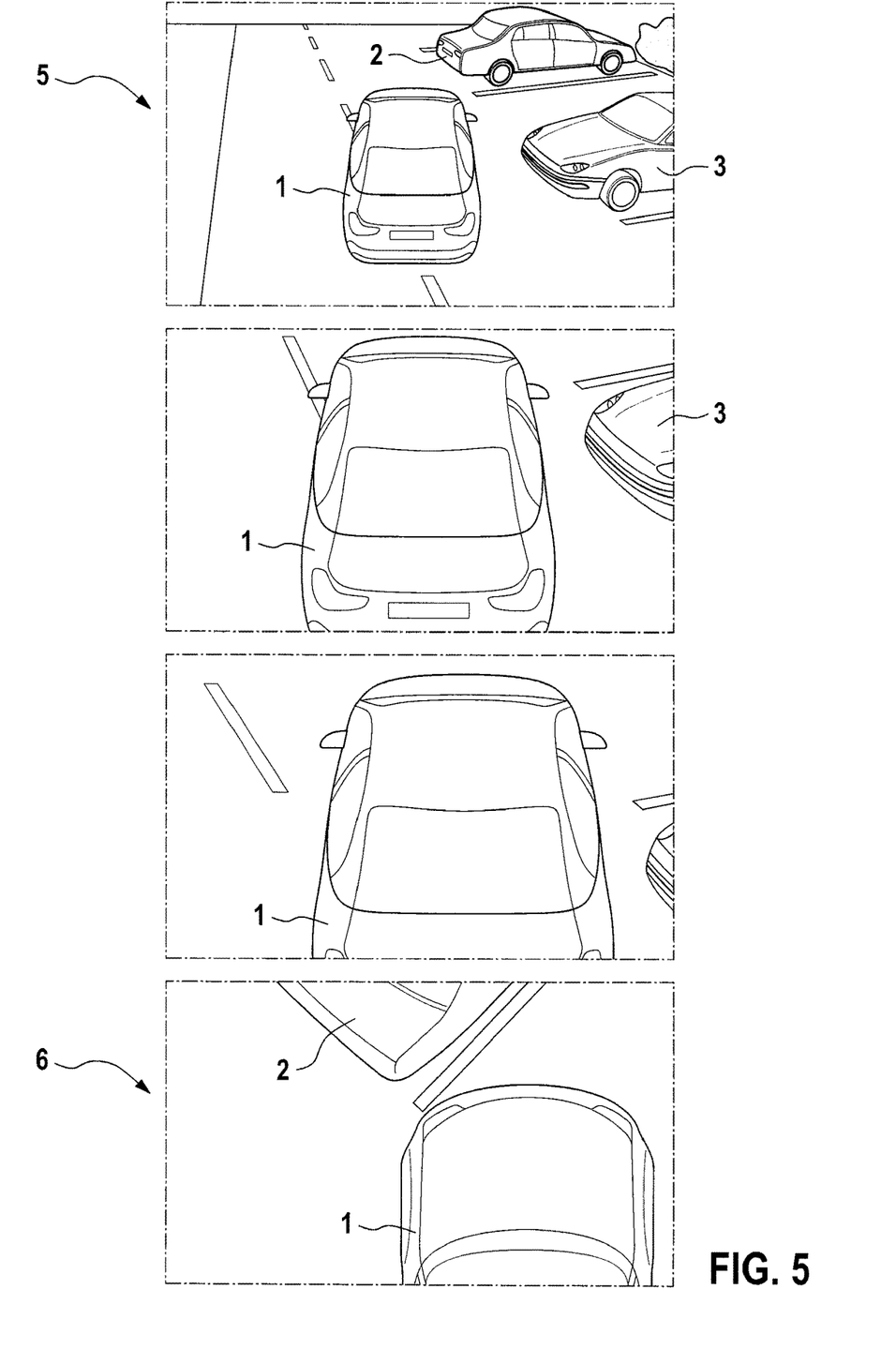
FIG. 5 is a schematic representation of substeps of a change of a virtual perspective during a changeover from the first depiction to a second depiction during the implementation of the method according to one exemplary embodiment of the present invention.

FIG. 5 schematically shows a first possibility for displaying 400 second depiction 6, 7. In the process, starting from first depiction 5 shown in FIG. 3 or in FIG. 4, a change of a virtual perspective as well as a change of a zoom from first depiction 5 to second depiction 6 takes place. This means, second depiction 6 arises from first depiction 5. In FIG. 5, individual intermediate images of the changeover from first depiction 5 to second depiction 6 is shown, aforementioned changeover preferably being a continuous animation. In particular, first depiction 5 is represented on display device 10, in that first depiction 5 completely fills display device 10. Due to the change of perspective as well as the zoom change, second depiction 6 therefore also completely fills display device 10. First depiction 5 is no longer represented.

It is apparent that second depiction 6, 7 therefore displays a detail from first depiction 5, the perspective and the zoom additionally having been changed. As a result, the area of the surroundings at which the approach by vehicle 1 to obstacle 2, 3, 4—in FIG. 5, first obstacle 2—takes place, may be displayed in vehicle 1 to the driver of the vehicle. Therefore, the driver is explicitly made aware of the fact that vehicle 1 is approaching an obstacle 2, 3, 4.

The possibility shown in FIG. 5 therefore has the disadvantage that first depiction 5 is no longer visible. As a result, the driver of the vehicle no longer has an overview of the parking situation, since only second depiction 6 is displayed on display device 10. This is also disadvantageous when vehicle 1 approaches multiple obstacles 2, 3, 4. In the parking situation according to the exemplary embodiment, not only is an approach by vehicle 1 to first obstacle 2 present, but rather vehicle 1 is also approaching second obstacle 3.

Figure 6:
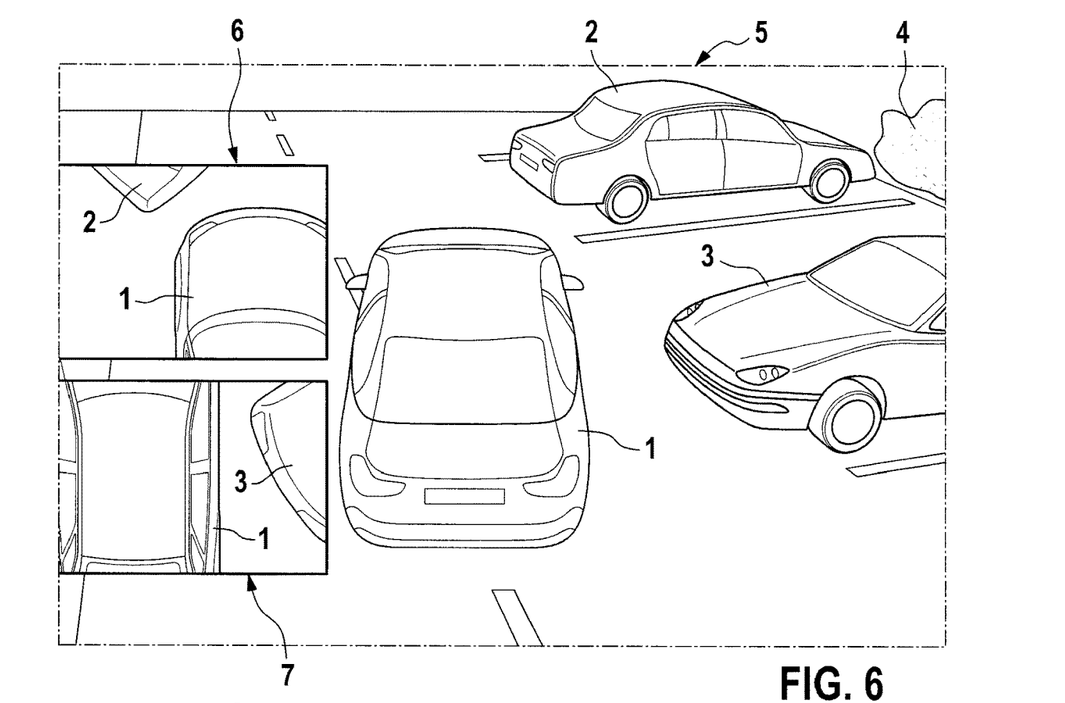
FIG. 6 is a first schematic representation of a combination of the first depiction and the second depiction during the implementation of the method according to the exemplary embodiment of the present invention.
Figure 7:
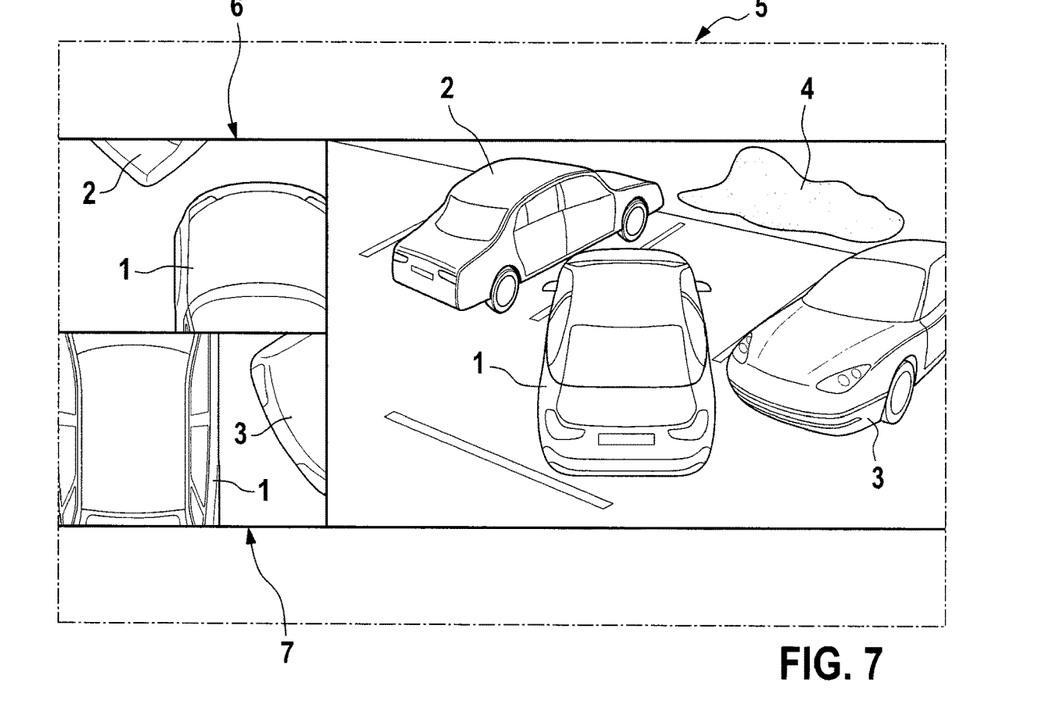
FIG. 7 is a second schematic representation of the combination of the first depiction and the second depiction during the implementation of the method according to the exemplary embodiment of the present invention.

Moreover, in order to be able to warn the driver of vehicle 1 about approaching obstacles 2, 3, 4 in a comprehensive way, two different second depictions 6, 7 are therefore displayed. One of second depictions 6 shows the approach by vehicle 1 to first obstacle 2, while another second depiction 7 represents the approach by vehicle 1 to second obstacle 3. In FIGS. 6 and 7, two different possibilities are shown regarding how second depictions 6, 7 may be displayed together with first depiction 5 on display device 10. In FIG. 6, second depictions 6, 7 are superimposed on first depiction 5. In FIG. 7, first depiction 5 and second depictions 6, 7 are displayed next to one another. In FIG. 6, it is therefore apparent that there is a risk of a loss of information with respect to first depiction 5, since, due to the superimposition with second depictions 6, 7, all areas from first depiction 5 may no longer be seen. By contrast, second depictions 6, 7 appear as notifications having higher priority, due to their representation in the foreground of the first depiction, so that the attention of the driver is directed to the approach to obstacles 2, 3 in a targeted manner. A scaling is necessary, however, in order to display first depiction 5 and second depictions 6, 7 next to one another, as drafted in FIG. 7, since first depiction 5 previously occupying entire display device 10 must now be reduced in size. It is ensured, however, that information is not lost in the display of first depiction 5.

Figure 8:
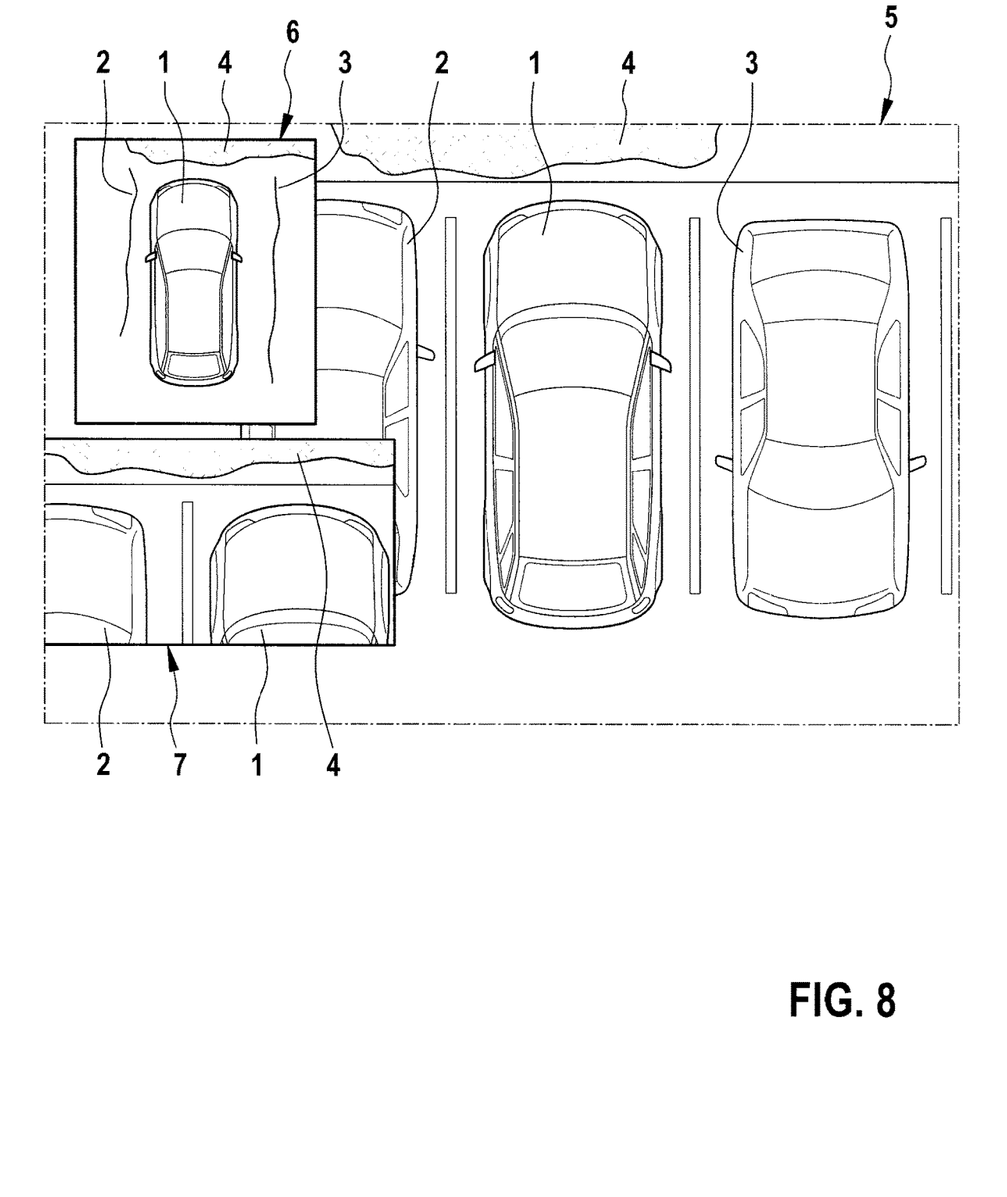
FIG. 8 is a third schematic representation of the combination of the first depiction and the second depiction during the implementation of the method according to the exemplary embodiment of the present invention.

FIG. 8 shows a further possibility of the combined display of first depiction 5 and second depictions 6, 7. In FIG. 8, vehicle 1 has nearly reached its final parking position. Therefore, a third obstacle 4 is present next to first obstacle 2 and second obstacle 3, third obstacle 4 representing a boundary wall. Therefore, a plurality of areas is present, at which vehicle 1 approaches obstacles 2, 3, 4. A second depiction 6 is therefore displayed in such a way that only schematic elements are utilized. This means, in addition to a representation of vehicle 1, further obstacles 2, 3, 4 are merely schematically displayed. In the example shown in FIG. 8, edges are displayed, which represent an edge of a detected obstacle. Therefore, the driver of vehicle 1 obtains a precise overview of the distance between his/her vehicle 1 and obstacles 2, 3, 4 in the surroundings of vehicle 1. As a result, vehicle 1 may be driven in the surroundings safely and in a collision-free manner despite obstacles 2, 3, 4. Moreover, further second depiction 7 shows a texture in a manner similar to that with respect to above-described FIGS. 6 and 5.

Due to the above-described method, a display is therefore optimized depending on a detected approach to an obstacle 2, 3, 4, in order to warn the driver about the aforementioned approach in a timely manner. This results in enhanced safety during operation of vehicle 1, since the risk of collisions with obstacles 2, 3, 4 in the surroundings is reduced.

What is claimed is:

1. A method for representing surroundings of a vehicle, comprising:
    detecting the surroundings of the vehicle and ascertaining obstacles in the surroundings using surroundings sensors of the vehicle;
    displaying, on a display device, a first depiction, which is a representation of a driver-viewing-frustum perspective view of an area of the surroundings including the obstacles and a representation of an entirety of the vehicle, the first depiction displayed by the displaying device occupying a first region and second region of the display device; and
    in response to a combination of detecting (a) that a distance of the vehicle to an obstacle of the ascertained obstacles, represented in its entirety in the first depiction, is below a predefined threshold distance and (b) that a movement of the vehicle is in a direction approaching towards the obstacle:
        identifying a point of the obstacle with which the vehicle is at a highest risk, compared to other points of the obstacle, of collision;
        identifying a point of the vehicle which is at a highest risk, compared to other points of the vehicle, for the collision;
        scaling down the first depiction so that the first depiction is displayed to occupy the first region of the display device and not the second region of the display device;
        generating a second depiction, which is a representation of a bird's eye view of (a) a sub-portion of the vehicle including the identified point of the vehicle, and (b) a sub-area of the area, the sub-area being selected to encompass the identified point of the obstacle, wherein the second depiction does not include a representation of the entirety of the vehicle, does not include a representation of the entirety of the obstacle, and is at a higher zoom setting than the first depiction; and
        displaying the generated second depiction in the second region of the display device alongside the display of the scaled down first depiction in the first region.

2. The method as recited in claim 1, wherein the first depiction and the second depiction are generated based on a three-dimensional model of the surroundings, the three-dimensional model having been generated based on the detected surroundings and the ascertained obstacles.

3. The method as recited in claim 1, wherein the second depiction schematically represents a distance between the vehicle and the obstacle which the vehicle is approaching, without textures.

4. The method as recited in claim 1, wherein, in the first depiction and/or in the second depiction, the obstacle being approached by the vehicle is emphasized with a marking.

5. The method as recited in claim 1, wherein the displaying of the generated second depiction includes displaying an animation of a transition from the first depiction to the second depiction.

6. The method as recited in claim 5, wherein the displaying of the animation includes displaying at least one intermediate depiction having a view that is between the driver-viewing-frustum perspective view of the first depiction and the bird's eye view of the second depiction.

7. The method as recited in claim 5, wherein the displaying of the animation includes displaying at least one intermediate depiction having a zoom setting that is between the zoom setting of the first depiction and the zoom setting of the second depiction.

8. The method as recited in claim 5, wherein the displaying of the animation includes displaying at least one intermediate depiction having (a) a view that is between the driver-viewing-frustum perspective view of the first depiction and the bird's eye view of the second depiction and (b) a zoom setting that is between the zoom setting of the first depiction and the zoom setting of the second depiction.

9. A non-transitory machine-readable memory medium on which is stored instructions that are executable by a control unit and that, when executed by the control unit, cause the control unit to perform a method for representing surroundings of a vehicle, the method comprising:
    detecting the surroundings of the vehicle and ascertaining obstacles in the surroundings using surroundings sensors of the vehicle;
    displaying, on a display device, a first depiction, which is a representation of a driver-viewing-frustum perspective view of an area of the surroundings including the obstacles and a representation of an entirety of the vehicle, the first depiction displayed by the displaying occupying a first region and second region of the display device; and
    in response to a combination of detecting (a) that a distance of the vehicle to an obstacle of the ascertained obstacles, represented in its entirety in the first depiction, is below a predefined threshold distance and (b) that a movement of the vehicle is in a direction approaching towards the obstacle:
        identifying a point of the obstacle with which the vehicle is at a highest risk, compared to other points of the obstacle, of collision;

identifying a point of the vehicle which is at a highest risk, compared to other points of the vehicle, for the collision;

scaling down the first depiction so that the first depiction is displayed to occupy the first region of the display device and not the second region of the display device;

generating a second depiction, which is a representation of a bird's eye view of (a) a sub-portion of the vehicle including the identified point of the vehicle, and (b) a sub-area of the area, the sub-area being selected to encompass the identified point of the obstacle, wherein the second depiction does not include a representation of the entirety of the vehicle, does not include a representation of the entirety of the obstacle, and is at a higher zoom setting than the first depiction; and displaying the generated second depiction in the second region of the display device alongside the display of the scaled down first depiction in the first region.

10. A system for a vehicle, the system comprising:

a control unit; and an interface for connecting the control unit to surroundings sensors and a display device;

wherein the control unit is configured to perform a method for representing surroundings of the vehicle, the method comprising:

detecting the surroundings of the vehicle and ascertaining obstacles in the surroundings using the surroundings sensors of the vehicle;

displaying, on the display device, a first depiction, which is a representation a driver-viewing-frustum perspective view of an area of the surroundings including the obstacles and a representation of an entirety of the vehicle, the first depiction displayed by the displaying occupying a first region and second region of the display device; and in response to a combination of detecting (a) that a distance of the vehicle to an obstacle of the ascertained obstacles, represented in its entirety in the first depiction, is below a predefined threshold distance and (b) that a movement of the vehicle is in a direction approaching towards the obstacle:

identifying a point of the obstacle with which the vehicle is at a highest risk, compared to other points of the obstacle, of collision;

identifying a point of the vehicle which is at a highest risk, compared to other points of the vehicle, for the collision;

scaling down the first depiction so that the first depiction is displayed to occupy the first region of the display device and not the second region of the display device;

generating a second depiction, which is a representation of a bird's eye view of (a) a sub-portion of the vehicle including the identified point of the vehicle, and (b) a sub-area of the area, the sub-area being selected to encompass the identified point of the obstacle, wherein the second depiction does not include a representation of the entirety of the vehicle, does not include a representation of the entirety of the obstacle, and is at a higher zoom setting than the first depiction; and displaying the generated second depiction in the second region of the display device alongside the display of the scaled down first depiction in the first region.

\* \* \* \* \*